US007839982B2

(12) United States Patent
Dalrymple et al.

(10) Patent No.: US 7,839,982 B2
(45) Date of Patent: Nov. 23, 2010

(54) SYSTEMS AND METHODS FOR ROUTING EMERGENCY COMMUNICATIONS

(75) Inventors: Tim J. Dalrymple, Columbia, MD (US); Michelle M. Johnston, Rockville, MD (US); John J. Bruce, Media, PA (US)

(73) Assignee: Verizon Services Corp., Ashburn, VA (US)

( * ) Notice: Subject to any disclaimer, the term of this patent is extended or adjusted under 35 U.S.C. 154(b) by 1223 days.

(21) Appl. No.: 11/436,552

(22) Filed: May 19, 2006

(65) Prior Publication Data

US 2007/0269024 A1 Nov. 22, 2007

(51) Int. Cl.
*H04M 11/00* (2006.01)
(52) U.S. Cl. ........................................................ 379/45
(58) Field of Classification Search .................. 379/45, 379/37; 370/352, 217–220
See application file for complete search history.

(56) References Cited

U.S. PATENT DOCUMENTS

2002/0101817 A1  8/2002  Teixeira

2003/0198331 A1*  10/2003  Lass et al. ................... 379/242
2005/0053059 A1*  3/2005  Smith ........................ 370/376
2007/0071182 A1*  3/2007  Elder et al. .................. 379/45

OTHER PUBLICATIONS

Viking Technical Practice (RAD-1A) (4 pages).
Zhone article entitled "Zhone Announces Support For Distributed Emergency Stand Alone Service" (2 pages).
SIP Center dated Jun. 2, 2005 entitled "MetaSwitch Unveils Industry's First 'Open Packet Host/Remote Architecture'" (3 pages).
Nortel Networks entitled "Voice over IP Solutions Succession Media Gateway 9000" (4 pages).
Lucent—5E-XC Remote Line Unit for Service Providers (3 pages).

* cited by examiner

*Primary Examiner*—Stella L Woo

(57) ABSTRACT

In one of many possible embodiments, a system includes a remote device configured to receive an emergency communication from a subscriber device, a Public-Switched Telephone Network ("PSTN") switch, and a remote access device connected to the remote device and the PSTN switch. The remote device is configured to forward the emergency communication to the remote access device when the remote device is in Emergency Standalone ("ESA") mode. The remote access device is configured to form a connection between the remote device and the PSTN switch such that the emergency communication is sent to the PSTN switch. The PSTN switch is configured route the emergency communication to an emergency service application.

18 Claims, 4 Drawing Sheets

SYSTEMS AND METHODS FOR ROUTING EMERGENCY COMMUNICATIONS

BACKGROUND INFORMATION

Many communication networks employ architectures commonly referred to as host-remote architectures. In such architectures, a host device is typically connected to several remote devices, which are in turn connected to one or more devices at subscriber premises. Host-remote architectures are able to provide network access at many geographic locations while also minimizing equipment and operation costs by centralizing certain network functions at host devices. Remote devices do not require all of the equipment implemented in host devices because, during normal operations, remote devices depend on host devices for certain operations and information. For example, host devices often maintain routing information used by remote devices to make routing decisions.

On occasion, however, a remote device may be unable to communicate with its corresponding host device. For example, connectivity between the remote device and the host device may be lost, or the host device may fail. Because of the chance of becoming isolated from a host device, and consequently from the rest of the communication network, certain remote devices have been configured to operate in what is commonly referred to as Emergency Standalone ("ESA") mode when isolated from a host device. In ESA mode, a remote device may be configured to take over control of routing functions. However, because the connection (e.g., a trunk line) to the host device is unavailable, communications can generally be routed only to lines connected directly to the remote device (i.e., local lines).

When a remote device is in ESA mode, subscribers connected to the remote device will not be able to complete communications that require use of the connection between the remote device and its host device. This scenario is especially troublesome for emergency "911" communications that would normally be routed through the connection to the host device. A person initiating a 911 communication may get no more than a fast busy signal. Clearly, such a condition may be catastrophic to any person in need of immediate emergency assistance.

Several attempts have been made to make 911 services reachable during ESA mode. For example, certain remote devices have been configured to forward 911 communications directly to local emergency service providers (e.g., local police or fire departments having communication devices served by the remote devices). However, this type of solution requires emergency service providers to have an emergency telephone number and device, as well as one or more persons continuously monitoring the telephone device. The persons may also have to undergo training related to answering incoming 911 communications. Consequently, local forwarding of 911 communications directly to emergency service providers is an expensive and rudimentary solution.

In addition, local forwarding of emergency 911 communications does not provide access to full 911 services. For example, automatic location identification ("ALI") information is not provided along with locally forwarded emergency communications. Unfortunately, the absence of ALI information can delay emergency response actions. Moreover, local forwarding of an emergency communication to a local public safety answering point ("PSAP") may be suitable in some circumstances, such as when the location of a communication initiator happens to be within the geographical area served by the local PSAP to which the communication is forwarded. However, this is not a suitable solution when the location of the communication initiator is not served by the locally available PSAP. In such instances, access to full 911 services is desired so that appropriate PSAPs can be identified based on locations of initiators of emergency communications and so that ALI information can be provided to the PSAPs receiving emergency communications.

Other existing solutions also have shortcomings. For example, certain solutions are vendor specific. That is, the solutions are designed for specific equipment and therefore require network operators using other types of equipment to purchase different and expensive equipment from a particular vendor. Accordingly, vendor-specific solutions are not practical solutions for many deployed communication networks.

Yet other existing solutions work only for specific types of communications and are incompatible with other communication types and formats. For example, certain existing solutions are designed for Time Division Multiplexing ("TDM") communication signals but do not work for Voice over Internet Protocol ("VoIP") communication signals. Accordingly, the existing state of the art does not include a widely compatible and cost-effective solution for routing emergency 911 communications to full 911 services when in ESA mode.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

Preferred embodiments according to the present invention may be implemented as systems and methods for routing emergency communications in Emergency Standalone ("ESA") mode. While the exemplary embodiments described herein relate to the routing of emergency "911" communications, other embodiments may similarly route other types of communications associated with predetermined directory numbers, including emergency communications associated with directory numbers other than "911." Emergency 911 communications will be understood by those skilled in the art.

According to certain embodiments, when an emergency 911 communication is received by a remote device in ESA mode, the remote device is able to forward the emergency communication to a line terminated by a remote access device, which is in turn connected to a Public Switched Telephone Network ("PSTN") switch. The remote access device may be configured to form a connection between the remote device and a PSTN switch such that the connection can carry the emergency 911 communication to the PSTN switch. The PSTN switch may then recognize the incoming emergency communication and perform predefined 911 translations to route the 911 communication to an appropriate full-service emergency 911 application such as an emergency 911 router and/or Public Safety Answering Point ("PSAP"). The PSAP can receive the emergency 911 communication, along with identifier and location information associated with the source of the communication. In this manner, an emergency 911 communication received by the remote device in ESA mode can be forwarded to a PSTN switch, which can route the emergency 911 communication over the Public Switched Telephone Network to an appropriate emergency 911 application.

The remote access device can be easily and inexpensively implemented either as communication networks are deployed or in many already-deployed communication networks, including both independent and overlaid VoIP networks, for example. Accordingly, an emergency 911 communication received through a Voice over Internet Protocol ("VoIP") network can be routed to an appropriate emergency 911 application (e.g., a PSAP) even when the remote device (e.g., a "soft switch") receiving the emergency communication has been isolated from the rest of the VoIP network. These and other benefits of the present systems and methods provide network operators with an elegant and cost-effective solution for effectively processing emergency 911 communications in ESA mode.

II. Exemplary System

Figure 1:
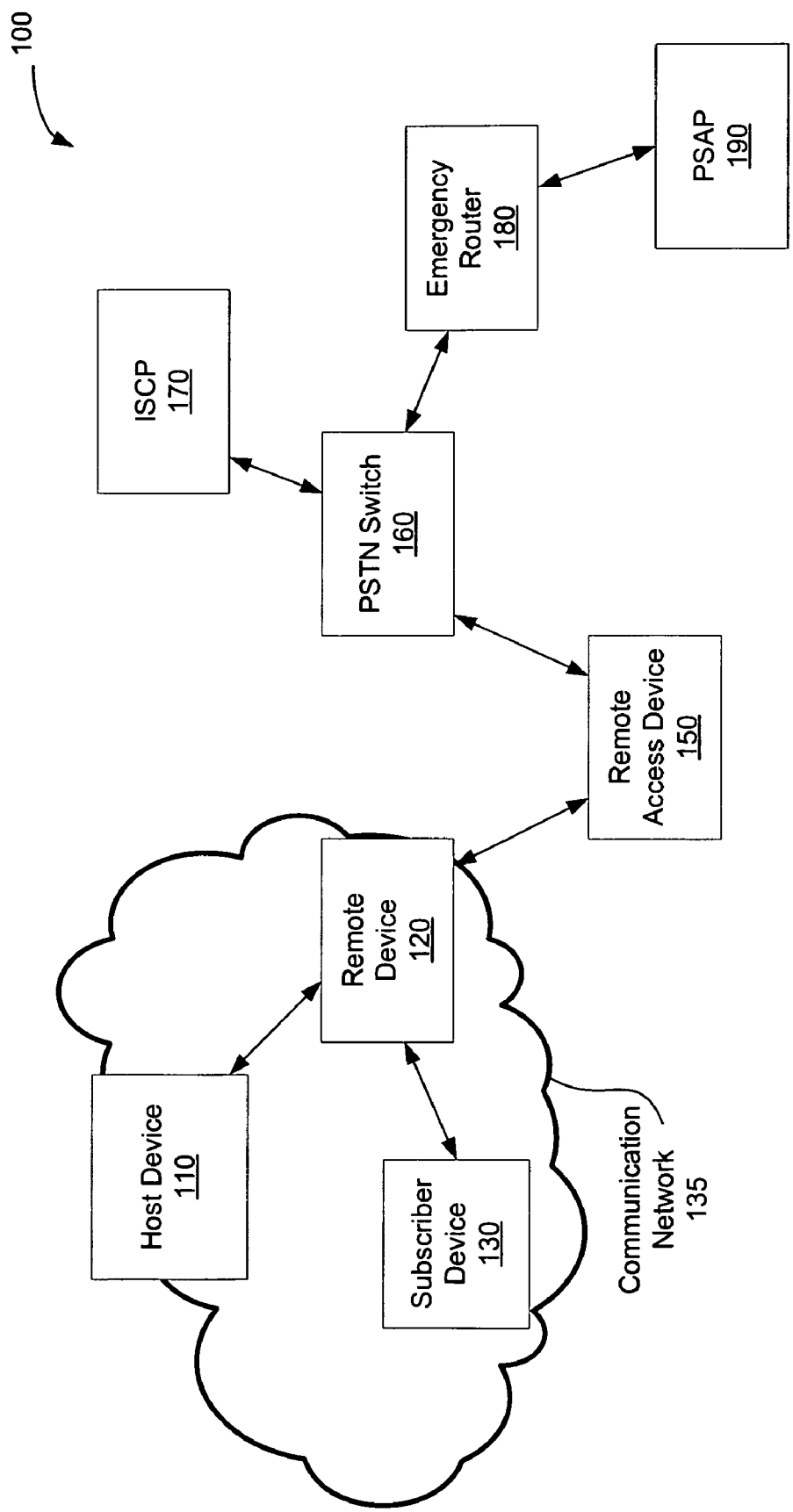
FIG. 1 is a block diagram illustrating an exemplary system for routing emergency communications in ESA mode, according to an embodiment.

Turning now to the figures, FIG. 1 is a block diagram of an exemplary system 100 for routing emergency communications (e.g., emergency 911 communications such as 911 voice calls) under ESA mode, according to an embodiment. As shown in FIG. 1, host device 110 may be communicatively coupled to remote device 120, which may be communicatively coupled to subscriber device 130. Host device 110, remote device 120, and subscriber device 130 may form or be part of one or more communication networks such as communication network 135, for example.

As further shown in FIG. 1, remote device 120 may be communicatively coupled to remote access device 150, which may in turn be communicatively coupled to Public Switched Telephone Network ("PSTN") switch 160. Remote access device 150 may be configured to form one or more communication connections between remote device 120 and PSTN switch 160, as discussed below. PSTN switch 160 may be communicatively coupled to Integrated Service Control Point 170 ("ISCP 170") and emergency router 180. Emergency router 180 may be configured to route emergency communications to Public Safety Access Point 190 ("PSAP 190"). As will be described in detail below, system 100 is able to route emergency communications received at remote device 120 in ESA mode to appropriate emergency 911 service applications (e.g., emergency router 180 and/or PSAP 190) by connecting remote device 120 to PSTN switch 160 using remote access device 150.

Any suitable communications technologies may be used to establish and carry communications between the communicatively coupled elements of FIG. 1. While exemplary communication technologies will be described below in reference to certain embodiments, other embodiments may use other suitable communication technologies for communications between the elements shown in FIG. 1.

The elements shown in FIG. 1 may be implemented as software, hardware, firmware, or combinations thereof. Accordingly, certain elements of system 100 may include software and/or firmware modules configured to be executed on one or more computing devices. Thus, system 100 may be implemented on more than one physical computing device, which may include any computing devices known to those skilled in the art, and may employ any of a number of computer operating systems known to those skilled in the art, including, but by no means limited to, known versions and/or varieties of the Microsoft Windows® operating system, the Unix operating system, the Linux operating system, operating systems known to be used in communication networks, and any other suitable operating systems.

Accordingly, those skilled in the art will recognize that the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computing device (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, those skilled in the art will recognize that the exemplary components illustrated in the Figure are not intended to be limiting. Indeed, those skilled in the art will recognize that other alternative hardware environments and implementations may be used. For example, multiple remote devices 120 may be communicatively connected to host device 110. By way of another example, one or more remote access device 150 may be used to communicatively connect remote device 120 and PSTN switch 160. Each of the elements shown in FIG. 1 will now be described in detail.

A. Communication Network

Communication network 135 may include, but is not limited to, one or more Voice over Internet Protocol ("VoIP") networks, Public Switched Telephone Networks ("PSTNs"), overlay VoIP networks (e.g., a VoIP network overlaid on a PSTN), wireless communication networks (e.g., cellular telephone or satellite pager networks), wireline networks, packet-switched networks, circuit-switched networks, other communication networks capable of carrying emergency communications, or any combination or subset of the above-listed networks. Communication network 135 may be configured to carry one or more types of communication signals, including, but not limited to, Internet Protocol signals (i.e., IP-based signals), Time Division Multiplexing ("TDM") signals, Session Initiation Protocol ("SIP") signals, PSTN signals, wireless signals (e.g., Code Division Multiple Access ("CDMA"), Time Division Multiple Access ("TDMA"), and Global System for Mobile communication ("GSM") signals), voice signals, and any other communication signals capable of representing or carrying emergency 911 communications.

As shown in FIG. 1, communication network 135 may include host device 110, remote device 120, and subscriber device 130, each of which may be configured to process one or more of the communication types listed above. In certain embodiments, communication network 135 includes a VoIP network, and host device 110, remote device 120, and subscriber device 130 are configured to process one or more types of communications signals suitable for VoIP communications.

1. Subscriber Device

Subscriber device 130 may include, but is not limited to, one or more telephony devices, IP-enabled devices (e.g., IP telephones), session initiation protocol ("SIP") enabled devices (e.g., SIP telephones), mobile telephones (e.g., mobile IP telephones, mobile SIP telephones, and/or cellular telephones), satellite pagers, Plain Old Telephone Service ("POTS") devices (e.g., POTS telephones), PSTN devices (e.g., switches), Private Automatic Branch Exchanges ("PABXs"), VoIP devices, analog telephone adapters (ATAs), video-enabled voice communication devices, subscriber-side switches, gateways, or routers, desktop computers, laptop computers, tablet computers, handheld devices, personal data assistants, wireless internet devices, embedded computers, video phones, mainframe computers, mini-computers, workstations, modems, network interface devices, optical network terminals, programmable logic devices, computing devices operating soft phones, and any other device capable of communicating an emergency communication to remote device 120. Thus, an emergency communication (e.g., an emergency 911 call) may be initiated and/or transmitted to remote device 120 by subscriber device 130.

Subscriber device 130 may be communicatively coupled to remote device 120 by any suitable communication technologies, including, but not limited to, access technologies such as optical fiber (e.g., fiber to the premises ("FTTP")), Digital Subscriber Lines ("DSL"), T-1 lines, cable, broadband, copper wiring, and PSTN telephone line technologies. Other suitable communication technologies may be used, including any suitable wireless access technologies such as cellular telephone, satellite, wireless network, and wireless broadband technologies.

2. Host Device

Host device 110 may be communicatively coupled to remote device 120 by any suitable communication technologies, including, but not limited to, one or more network connections, trunk lines, Synchronous Optical Network ("SONET") rings, optical fiber lines, copper wiring, other wireline connections, and wireless connections. In certain embodiments, the connection between host device 110 and remote device 120 may be referred to as a trunk connection. Typically, host device 110 connects remote device 120 to other devices (not shown) included in communication network 135.

Host device 110 may include one or more network elements, core processors, routers, host switches, soft switches, mobile switching centers ("MSCs"), or other devices capable of acting as a host to remote device 120. Accordingly, host device 110 may be configured to perform centralized communication functions, as will be understood by those skilled in the art. As known, host device 110 may be configured to control remote device 120, provide information to remote device 120, and/or instruct remote device 120 to perform certain processes. For example, host device 110 may provide routing information to remote device 120 for use in making routing decisions and/or performing routing functions. Accordingly, host device 110 may maintain or have access to routing information, such as information associated with other network elements (not shown), for example. In certain embodiments, host device 110 includes one or more Communication Server 2000 devices provided by Nortel Networks, which has a place of business in Ontario, Canada.

3. Remote Device

Remote device 120 may include access interfaces for forming connections with one or more subscriber devices such as subscriber device 130. The access interfaces may support one or more types of connection technologies and communication services, including, but not limited to, Plain Old Telephone Service ("POTS"), broadband, narrowband, Digital Subscriber Line ("DSL"), fiber-to-the-premises ("FTTP"), T-1, Digital Signal Level One ("DS-1"), switched services, non-switched services, as well as other suitable types of connections and services, as will be understood by those skilled in the art.

Remote device 120 may include one or more network interfaces configured to provide connectivity to host device 110. In certain embodiments, host device 110 provides connectivity to a backbone of communication network 135. The network interfaces may support any suitable communication protocols and formats. In certain embodiments, the network interfaces include interfaces for packet-switched communication protocols and formats such as Asynchronous Transfer Mode ("ATM"), Ethernet and Internet Protocol ("IP").

Remote device 120 may be configured to unite or convert between different types of communication protocols and formats. For example, access lines of any suitable type may be interfaced with one or more other access lines (including access lines of different types) or with one or more connections to host device 110. Accordingly, remote device 120 may convert between different types of communications, including packet-based communications and TDM communications, for example. Therefore, remote device 120 may be configured to support VoIP and/or Time Division Multiplexing ("TDM") communications.

Remote device 120 may include one or more devices configured to perform remote communication functions, including, but not limited to, remote communication switching functions. Remote device 120 may include one or more remote line units ("RLUs"), media gateways, processors, remote SIP-enabled devices, remote switches, routers, soft switches, and wireless base station devices (e.g., transmitters, receivers, and antennae). In certain embodiments, remote device 120 includes one or more Media Gateway 9000 devices provided by Nortel Networks, which has a place of business in Ontario, Canada.

As mentioned above, remote device 120 may lose communication with host device 110 and thereby become isolated from communication network 135. When this occurs, remote device 120 is able to initiate and operate in Emergency Standalone ("ESA") mode, as will be understood by those skilled in the art. In ESA mode, remote device 120 may take over certain functions normally controlled by host device 110. For example, remote device 120 may be configured to forward communications locally between different access lines that are directly connected to remote device 120. When communication is reestablished with host device 110, remote device 120 may be configured to return to normal operations.

Remote device 120 may be configured to recognize and automatically forward emergency communications (e.g., emergency 911 calls) received during ESA mode to one or more predetermined access ports connected to termination lines that have been dedicated for emergency communications received during ESA mode. As will be understood by those skilled in the art, remote device 120 may be configured to recognize incoming emergency communications by identifying communications that include one or more pre-determined directory numbers predefined as being associated with the emergency communications. In certain embodiments, one or more termination lines of remote device 120 are configured as the forwarding line(s) for emergency communications received during ESA mode. The predetermined termination line(s) may be terminated at remote access device 150, which may be configured to answer communications forwarded from remote device 120, thereby forming one or more connections between remote device 120 and PSTN switch 160, as described below.

B. Remote Access Device

Remote access device 150 may include one or more devices configured to form one or more connections between remote device 120 and PSTN switch 160, the connections being suitable for carrying emergency communications. Remote access device 150 can terminate and extend one or more lines served by remote device 120 to access one or more other lines served by PSTN switch 160. This allows emergency communications received at remote device 120 in ESA mode to be forwarded to remote access device 150, which connects the emergency communications to PSTN switch 160.

In certain embodiments, remote access device 150 includes a "RAD-1A" device provided by Viking Electronics Inc. of Hudson, Wis. The RAD-1A device (or similar device) can be easily installed in new or existing communication networks. Accordingly, a connection between remote device 120 and PSTN switch 160 may be formed through remote access device 150 in a manner that is both cost-effective and easy to implement. The RAD-1A device may be modified to include a receiver off-hook filter helpful for disconnecting connections between remote device 120 and PSTN switch 160, as described further below.

Multiple RAD-1A devices may be used to connect additional lines between remote device 120 and PSTN switch 160. In certain embodiments, at least two RAD-1A devices are implemented between remote device 120 and PSTN switch 160. This provides a minimum of two lines that can be used to forward emergency communications from remote device 120 to PSTN switch 160. Remote device 120 may be configured with a hunt group (e.g., a two-line hunt group) for selecting which of the lines connected to the RAD-1A devices will receive forwarded emergency communications. Hunt groups will be understood by those skilled in the art.

Remote access device 150 may be connected to remote device 120 and PSTN switch 160 by any suitable communication technologies and media, including copper wiring, for example. In certain embodiments, remote access device 150, remote device 120, and PSTN switch 160 are separate physical entities located in physical proximity to one another (e.g., within the same wire center, co-location cage, point of presence, or central office). In such embodiments, jumper wires or other suitable short-distance connections may be used to connect remote access device 150 to both remote device 120 and PSTN switch 160.

Figure 2:
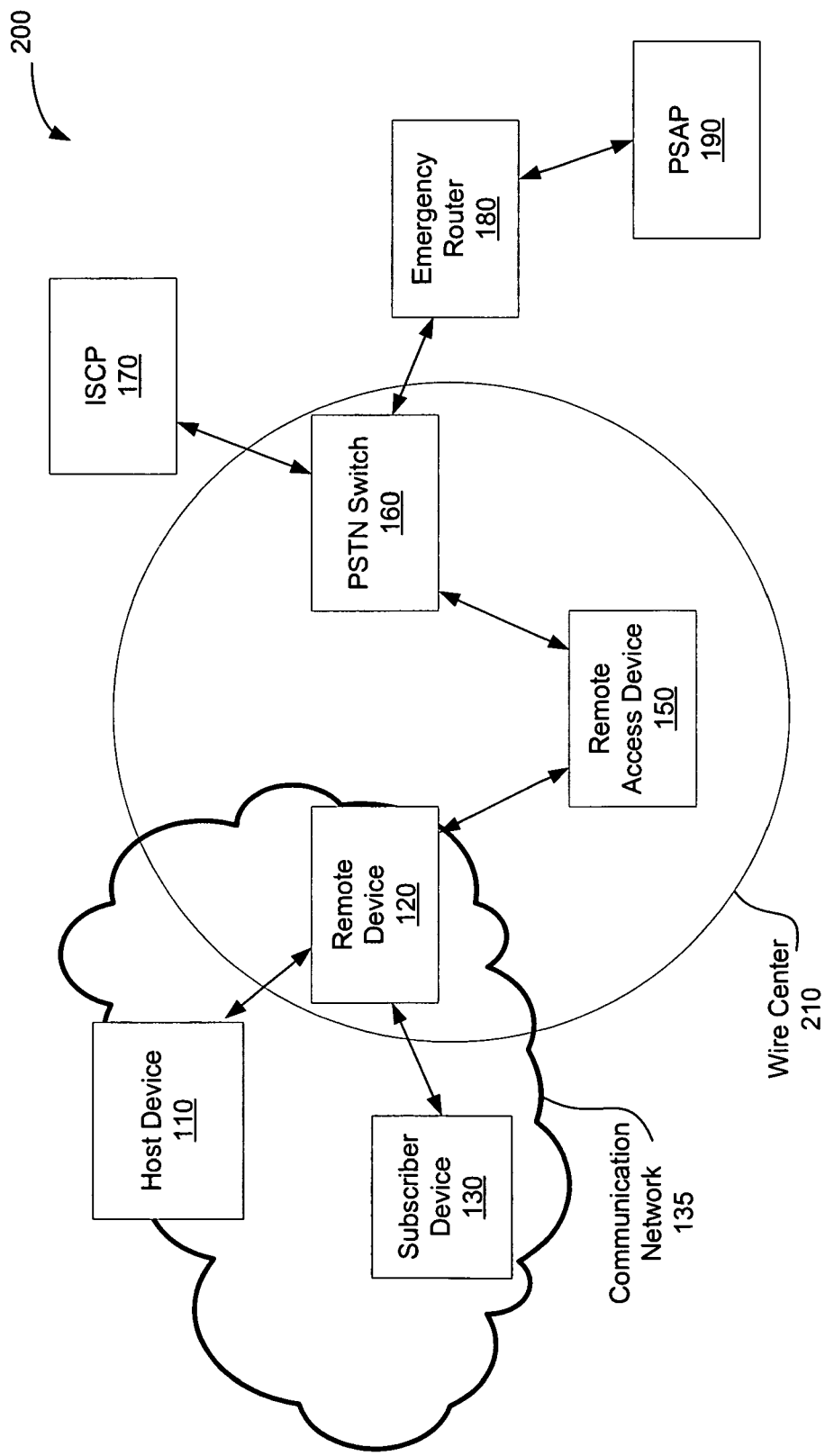
FIG. 2 is a block diagram illustrating an exemplary implementation of the system of FIG. 1, according to an embodiment.

FIG. 2 is a block diagram illustrating a particular implementation 200 of system 100 in which remote device 120, remote access device 150, and PSTN switch 160 are co-located in wire center 210. Wire center 210 may include central office equipment and/or other device(s) located physically proximate to one another so as to be conducive to forming connections between lines associated with the devices. Co-location of remote device 120 and PSTN switch 160 allows remote access device 150 to be conveniently connected to remote device 120 and PSTN switch 160, even when remote device 120 and PSTN switch 160 are already deployed in one or more existing communication networks. Because remote access device 150 can be easily connected to remote device 120 and PSTN switch 160, system 100 provides an elegant and cost-effective solution for routing emergency communications to emergency services (e.g., emergency 911 services) during ESA mode. System 100 is especially beneficial (e.g., cost-effective) in overlaid communication networks, including hybrid and migratory network architectures such as those used for migration from time division multiplexing ("TDM") signals to voice over Internet Protocol ("VoIP") signals.

Of course, remote access device 150, remote device 120, and PSTN switch 160 do not have to be in close proximity to one another and can be connected together even when located at different geographic locations. In certain embodiments, for example, remote access device 150 may be configured to connect one or more lines served by remote device 120 to one or more foreign exchange lines served by a remotely located PSTN switch. For instance, remote access device 150 may be connected to one or more foreign exchange lines (e.g., trunk lines) served by the nearest PSTN switch (e.g., PSTN switch 160).

Remote access device 150 may include one or more "Line In" ports connected to lines served by remote device 120 and one or more "Line Out" ports connected to lines served by PSTN switch 160. A connection between a "Line In" port and a corresponding "Line Out" port may be normally open so that remote access device 150 terminates the line connected to the "Line In" port. When remote device 120 forwards an emergency communication to the line terminated by the "Line In" port, remote access device 150 is able to recognize and answer the incoming communication. Remote access device 150 may provide loop closure between the "Line In" port and the corresponding "Line Out" port to draw dial tone from line connected to the "Line Out" port, which line is served by PSTN switch 160.

Figure 3:
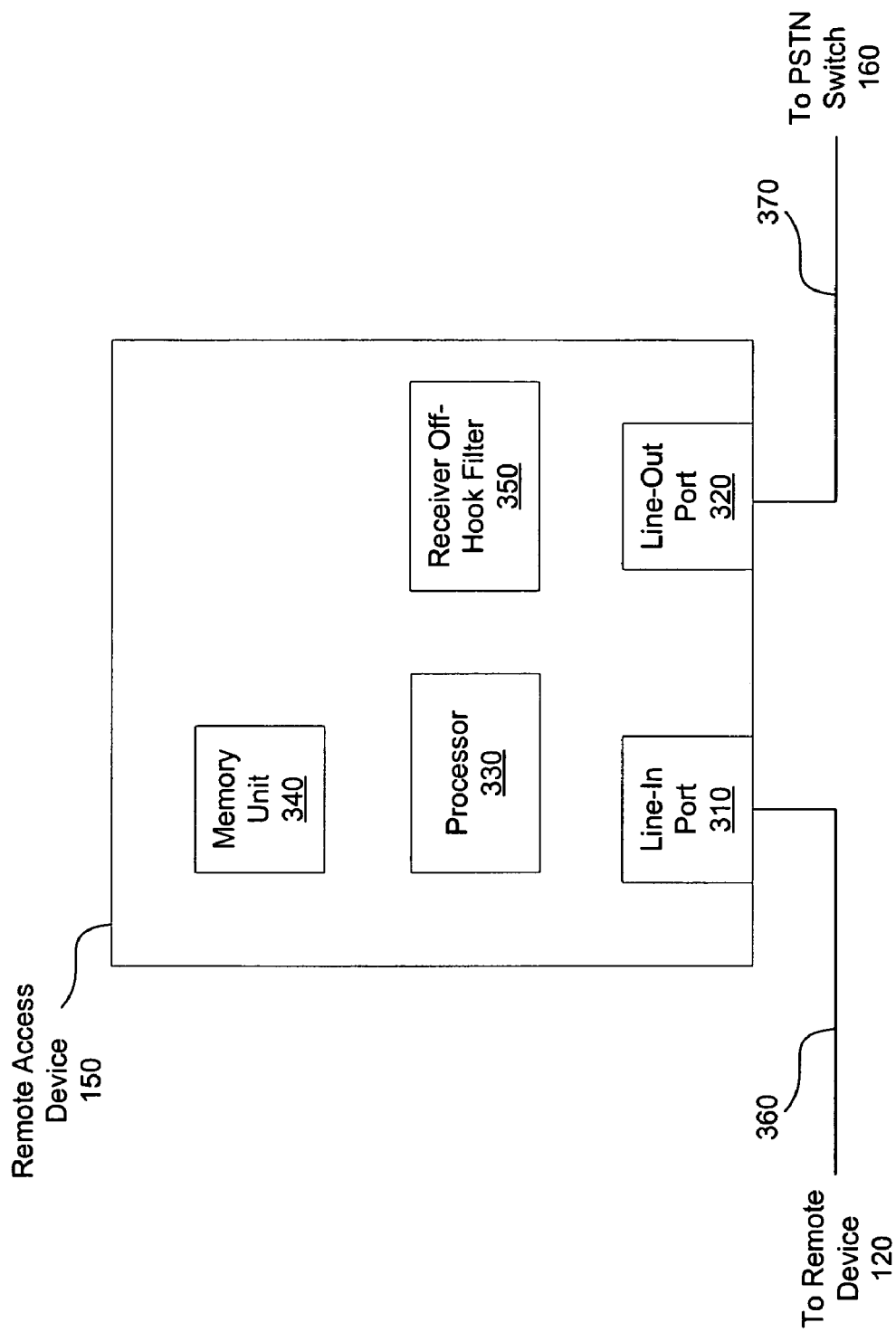
FIG. 3 is a block diagram illustrating an exemplary remote access device that may be implemented in the system of FIG. 1, according to an embodiment.

FIG. 3 is a block diagram illustrating an exemplary embodiment of remote access device 150. As shown in FIG. 3, remote access device 150 may include line-in port 310, line-out port 320, processor 330, memory unit 340, and receiver off-hook filter 350. Processor 330 may perform operations in accordance with data (e.g., instructions) stored in memory unit 340, including operations associated with any of the processes described herein.

Line-in port 310 may be connected to line 360, which is in turn connected to and served by remote device 120. Line-out port 320 may be connected to line 370, which is in turn connected to and served by PSTN switch 160. Accordingly, remote access device 150 may terminate line 360 and line 370 when a connection between line-in port 310 and line-out port 320 is open. The connection between line-in port 310 and line-out port 320 may be closed to establish a connection between line 360 and line 370. Line 360 and line 370 may comprise any suitable communication media.

When a communication is forwarded from remote device 120 to line 360, remote access device 150 is able to receive the forwarded communication on line-in port 360. Remote access device 150 may then answer the communication. In certain embodiments, remote access device 150 is configured to answer the communication on the first ring cycle, which will be understood by those skilled in the art.

Remote access device 150 may be configured to answer the incoming emergency communication by establishing a connection between line-in port 310 and line-out port 320, which connection provides loop closure between the ports and draws dial tone from line 370.

Line 370 may be translated (i.e., configured) to cause PSTN switch 160 to automatically dial 911 (or other predetermined emergency number) when an off-hook condition is detected on the line. Thus, when a connection is formed between remote device 120 and PSTN switch 160, PSTN switch 160 is configured to detect an off-hook condition on line 370, dial 911, and route the emergency communication to 911 service applications. An example of emergency communications being routed from PSTN switch 160 to 911 service applications will be described further below.

As mentioned above, remote access device 150 may include receiver off-hook filter 350, which may be configured to release the emergency communication in response to either endpoint of the communication disconnecting (e.g., hanging up). More specifically, receiver off-hook filter 350 may be configured to listen for a receiver off-hook signal on line 360 and line 370. Upon detecting a receiver off-hook signal on either line 360 or line 370, receiver off-hook filter 350 causes remote access device 150 to release the emergency communication. In other words, remote access device 150 releases remote device 120 and PSTN switch 160 when a receiver off-hook tone is detected. This helps ensure that completed emergency communications are released in a timely manner in order to free up resources (e.g., remote access device 150) for subsequent emergency communications.

Alternative to, or in addition to, using receiver off-hook filter 350 to release communications, remote device 120 may include functionality configured to enable remote device 120, when in ESA mode, to disconnect a connection with remote access device 150 by sending a disconnect message to remote access device 150. Upon reception of the disconnect message, remote access device 150 is able to release the corresponding emergency communication. The disconnect messaging functionality may be implemented in remote device 120 in any suitable format, including software, firmware, hardware, and any combination thereof.

C. PSTN Switch

Referring again to FIG. 1, PSTN switch 160 may comprise one or more devices capable of performing circuit-switching functions, including any such devices known in the art. For example, PSTN switch 160 may include one or more host and/or remote switches capable of switching TDM signals. Examples of PSTN switches include class five switches such as Number Five Electronic Switching System ("5ESS") switches, General Telephone Digital Class Five ("GTD-5") switches, Digital Multiplex System ("DMS") switches, and/or any other suitable switches known in the art.

PSTN switch 160 may include one or more line interfaces connected to and serving lines (e.g., line 370) connected to one or more "Line Out" ports (e.g., line-out port 320) of remote access device 150. Each line connected to remote access device 150 may be provisioned with an Advanced Intelligent Network ("AIN") Off Hook Immediate Trigger, which is configured to be initiated upon recognition of an off-hook event, as will be understood by those skilled in the art. For example, the trigger may be initiated when remote access device 150 forms a connection between line-in port 310 and line-out port 320 to draw dial tone from PSTN switch 160, thereby causing an off-hook event.

When the AIN Off-Hook Immediate Trigger is initiated, PSTN switch 160 is configured to route the emergency communication associated with a line (e.g., line 370) served by PSTN switch 160 to emergency 911 services. PSTN 160 may route emergency communications to emergency 911 services in any way known to those skilled in the art. However, certain additions and/or modifications to emergency 911 routing processes may be included in system 100, including additions and/or modification helpful for identifying emergency communications as originating from remote device 120 in ESA mode. Examples of such additions and modifications are described below.

PSTN switch 160 may route an emergency communication received over a line connected to remote access device 150 by dialing emergency 911 services and providing an identifier associated with the emergency communication to 911 service applications. The identifier may indicate the line (e.g., line 370) served by PSTN device 160 and connected to remote access device 150 as the origination line for the emergency communication. The identifier may be in any suitable form and include any suitable information, including, for example, a Calling Party Number ("CPN") that will be sent to 911 service applications. The line may be predefined as being associated with remote device 120 in ESA mode, as described further below. The identifier, as well as any information associated therewith, may be maintained by PSTN switch 160 or requested and obtained from another source such as ISCP 170, as described further below.

By using remote access device 150 to forward emergency communications from remote device 120 in ESA mode to PSTN switch 160, the emergency communications can be routed through the PSTN switch 160 to full-service emergency 911 service applications rather than being restricted to a local 911 administrative line having a direct and local connection to remote device 120. This is especially helpful when the location of a person initiating an emergency communication is not served by locally routable 911 services.

However, while not shown in FIG. 1, PSTN switch 160 may be connected to and serve one or more administrative lines for local forwarding of emergency communications to locally routable 911 services. The one or more local administrative lines may be terminated by and configured to ring down to a local PSAP or local emergency service providers. The one or more administrative lines can be used as backup for connections to full-service 911 applications.

Full-service emergency 911 applications to which PSTN switch 160 can route emergency communications may include any combination or subset of ISCP 170, emergency router 180, and PSAP 190, each of which will now be described in detail.

D. Integrated Service Control Point

As part of routing emergency communications to emergency 911 service applications, PSTN switch 160 may send requests (e.g., trigger requests such as "Origination Attempt" Transaction Capability Application Part ("TCAP") messages) for routing information to Integrated Service Control Point ("ISCP") 170. Accordingly, ISCP 170 may be configured to provide routing instructions to PSTN switch 160 in response to the requests, which will be understood by those skilled in the art.

ISCP 170 may include one or more application servers configured to receive trigger requests and use information included in the trigger requests to identify routing instructions useful for routing emergency communications to an appropriate emergency 911 service application (e.g., emergency router 180). ISCP 170 may include predefined data (e.g., Numbering Plan Area ("NPA") and/or Numeric Numbering Exchange ("NNX") codes associated with PSTN switch 160) and service logic useful for identifying appropriate routing instructions based on information included in trigger requests. The data and service logic, which may be updated to keep it current, can be defined to determine routing instructions useful for identifying emergency 911 service applications that serve an originator (or a geographic area associated with the originator) of an emergency communication.

The routing instructions provided by ISCP 170 may include information associated with emergency communications and their sources and/or paths. For example, ISCP 170 may be configured to recognize from a trigger request that an emergency communication has been received from the line 370 connecting line-out port 320 of remote access device 150 to PSTN switch 160. Accordingly, ISCP 170 may insert in the routing instructions information associated with the line 370, including a source identifier such as caller identification information, Calling Party Number ("CPN"), or Automatic Number Identification ("ANI") information.

PSTN switch 160 can use the routing instructions to determine an appropriate emergency 911 service application to which an emergency communication should be routed. For example, the routing instructions may identify a particular selective emergency 911 router (e.g., emergency router 180) configured to serve the originator (or geographic area associated with the originator) of the emergency communication. For instance, the originator of the emergency communication may be identified as line 370, and the service logic in ISCP 170 may provide routing instructions identifying emergency router 180 as the appropriate 911 service application to which the emergency communication should be routed. The service logic may be defined based on geographic areas served by PSAPs (e.g., PSAP 190) associated with emergency router 180.

In certain examples, ISCP 170 may be configured to identify information associated the originator of an emergency communication received by remote device 120. When ISCP 170 receives a query from PSTN switch 160, ISCP 170 may query host device 110 and/or remote device 120 to determine the originator of the emergency communication. The host device 110 and/or the remote device 120 may be able to provide the requested information. For example, when the originator of the emergency communication and a PSAP such as PSAP 190 are associated with a common remote device such as remote device 120, remote device 120 can identify the originator of an emergency communication in response to a request received from ISCP 170 because remote device 120 will typically store communication records (e.g., call records) in such situations. On the other hand, when the originator of the emergency communication and a PSAP such as PSAP 190 are not associated with a common remote device such as remote device 120, host device 110 may include information useful for identifying the originator of the emergency communication in response to a query received from ISCP 170 because host device 110 will typically store communication records (e.g., call records) in such situations. Accordingly, host device 110 and/or remote device 120 can respond to a query received from ISCP 170 by sending recorded communication information (e.g., caller identification information, calling party number, subscriber location information such as street addresses) to ISCP 170. ISCP 170 can communicate with host device 110 and/or remote device 120 using any suitable communication technologies, including those known in the art.

Once ISCP 170 receives a response from host device 110 or remote device 120, the information included in the response can be used to identify appropriate routing instructions as described above. Accordingly, the routing instructions identified and returned to PSTN switch 160 may be based on, in certain examples and situations, information associated with the originator of an emergency communication rather than being based on the line (e.g., line 370) serving remote access device 150. When the originator of the emergency communication is determined, emergency service applications may be able to use enhanced emergency service features such as enhanced 911 ("e-911") services, which will be understood by those skilled in the art.

The information returned by host device 110 or remote device 120 may be used by ISCP 170 to replace or modify the routing instructions determined to be associated with the line serving remote access device 150 and over which an emergency communication is received. In particular, ISCP 170 may replace or modify an identifier associated with line 370 that is used to identify the initiator of the emergency communication. For instance, if ISCP 170 determines that PSTN switch 160 typically routes emergency 911 communications to PSAP 190, which does not serve the same geographic as the area served by remote device 120, ISCP 170 may modify routing instructions to include an identifier that will direct PSTN switch 160 to route a particular emergency communication to another, more appropriate, emergency service application. By way of an example, ISCP 170 may modify the Calling Party Number ("CPN") to enable correct routing of an emergency communication to an appropriate PSAP. The capability of ISCP 170 to determine information associated with the originator of an emergency communication that has been routed through remote access device 150 is especially beneficial in situations in which PSTN switch 160 or PSAP 190 do not serve the same geographic area from which an emergency communication originated.

Thus, in certain examples, ISCP 170 may be configured to identify the originator of an emergency communication and use information associated with the originator to determine or modify routing instructions for the emergency communication. In case ISCP 170 cannot obtain information associate with the originator from host device 110 or remote device 120, ISCP 170 may be configured to return default routing instructions when an answer to a query to host device 110 and/or remote device 120 is not received within a predetermined time interval of the query being sent. For example, if for some reason, host device 110 and remote device 120 are unable to receive the query and provide an answer, ISCP 170 may default back to identifying routing instructions associated with the line (e.g., line 370) served by PSTN switch 160 and over which the emergency communication was received.

E. Emergency Router

PSTN switch 160 is able to use predefined translations (e.g., 911 translations) and the routing instructions received from ISCP 170 to route emergency communications to appropriate emergency 911 service applications. For example, PSTN switch 160 may route an emergency communication received through remote access device 150 to emergency router 180. Emergency router 180 may include or be implemented on any suitable PSTN device such as a host, remote, or tandem switch, for example.

Emergency router 180 may be configured to route the emergency communication to an appropriate PSAP (e.g., PSAP 190). To assist with routing decisions, emergency router 180 may include or have access to a database of routing information. For example, emergency router 180 may use data stored in an Automatic Line Identification ("ALI") database (not shown). As will be understood by those skilled in the art, an ALI database may include information associated with lines served by PSTN switch 160, including line 370. The information in the database may include location identifiers associated with the lines or the subscribers or devices served by the lines. Such information may be provided to emergency service applications along with emergency communications to help expedite effective emergency responses.

Information regarding lines served by PSTN switch 160 and connected to remote access device 150 (e.g., line 370) may be provisioned in the ALI database as lines associated with remote device 120 in ESA mode. Accordingly, emergency router 180 is able to identify emergency communications received from remote access device 150 (e.g., from the identifier associated with line 370) and determine that the emergency communications come from remote device 120 in ESA mode.

The information in the ALI database may include the geographic area served by remote device 120. Thus, in addition to being configured to successfully route an emergency communication to an appropriate PSAP during ESA mode, system 100 is also able to provide a geographic area approximating the location of the originator of the emergency communication. Such capabilities are useful for increasing the effectiveness and efficiency of emergency response services when remote device 120 is in ESA mode. Moreover, such features of system 100 are useful for bringing both new and existing communication networks, especially VoIP networks, into compliance with governmental regulations related to emergency response applications.

From information included in ALI database, emergency router 180 is able to identify and route emergency communications to an appropriate PSAP, such as PSAP 190.

F. PSAP

PSAP 190 may include one or more devices and operators associated with an emergency call center such as government sponsored call centers established to receive and process emergency 911 communications, as will be understood by those skilled in the art. System 100 enables emergency communications to be delivered to PSAP 190 along with data representative of identifiers associated with the PSTN lines connecting remote access device 150 and PSTN switch 160 (e.g., line 370). Other information may also be provided along with the emergency communications, including data representative of indications that the emergency communications were received from remote device 120 in ESA mode, as well as data representative of indications of the geographic area served by the remote device 120. Accordingly, 911 service equipment and/or operators are able to at least approximate the locations of originators of emergency communications even when remote device 120 is in ESA mode.

III. Exemplary Process View

Figure 4:
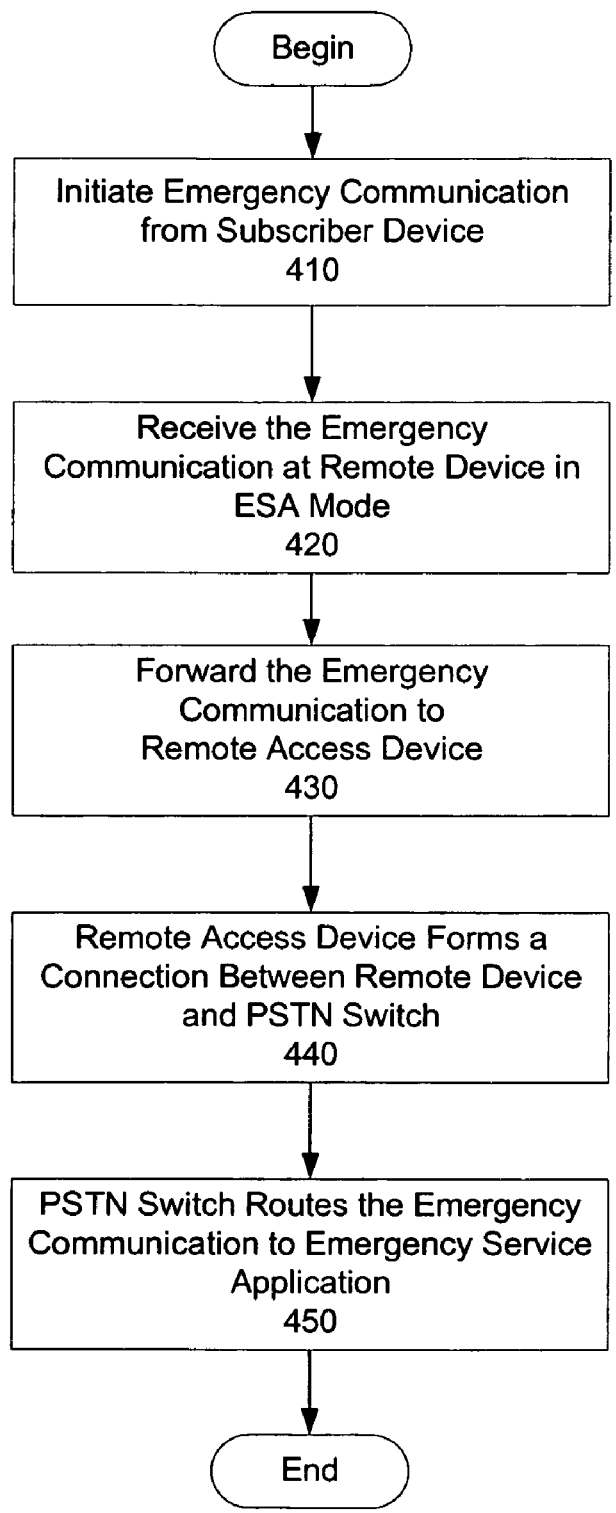
FIG. 4 is a flowchart illustrating an exemplary process for routing emergency 911 communications in ESA mode, according to an embodiment.

FIG. 4 illustrates an exemplary method of routing emergency communications in ESA mode, according to an embodiment. While FIG. 4 illustrates exemplary steps according to one embodiment, other embodiments may omit, add to, reorder, and/or modify any of the steps shown in FIG. 4.

In step 410, an emergency communication (e.g., a 911 call) is initiated from a subscriber device such as subscriber device 130. Step 410 may be performed in any suitable manner, including subscriber device or a user of subscriber device dialing a predetermined emergency telephone number such as "911."

In step 420, a remote device in ESA mode (e.g., remote device 120 in ESA mode) receives the emergency communication. In step 430, the remote device forwards the emergency communication to a remote access device such as remote access device 150. As described above, the remote access device may terminate a first line served by the remote device.

In step 440, the remote access device forms a connection between the remote device an a PSTN switch (e.g., PSTN switch 160) such that the emergency communication is sent to the PSTN switch. Step 440 may be performed in any of the ways described above. For example, the remote access device can receive the incoming communication over the first line connecting the remote device and the remote access device. The remote access device can connect the first line to a second line (e.g., line 370) served by the PSTN switch to draw dial tone from the PSTN switch, which may recognize and answer the emergency communication in any of the ways described above.

In step 450, the emergency communication is routed to an emergency service application, such as emergency router 180 and/or PSAP 190. Step 450 may be performed in any of the ways described above, including recognizing the emergency communication incoming to the PSTN switch, requesting and receiving routing instructions from an ISCP such as ISCP 170, and using the routing instructions and predefined translations to route the emergency communication to an emergency router such as emergency router 180. The emergency router may then route the emergency communication to a Public Safety Answering Point ("PSAP") such as PSAP 190.

As described above, the emergency service application(s) may be configured to identify that an emergency communication received through a line (e.g., line 370) connecting the remote access device to the PSTN switch came from the remote device in ESA mode. Accordingly, the emergency service application(s) can determine that the emergency communication originated within a geographic area served by the remote device, as described above. In some circumstances, this information may assist emergency service operators in effectively processing emergency communications.

In conclusion, the exemplary systems and methods described above are able to route emergency communications from a remote device in ESA mode to appropriate emergency service applications through a remote access device configured to establish connections between the remote device and a PSTN switch. By configuring the remote access device to bridge emergency communications from the remote device to the PSTN switch, translations in PSTN switches can be used to route the emergency communications toward appropriate emergency service applications. This may include routing the emergency communications over a trunk line served by the PSTN switch. Accordingly, the chance of subscribers not being able to connect to full-service emergency applications (e.g., 911 service applications) during ESA mode is eliminated or at least significantly reduced in a cost-effective manner.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a remote device configured to receive an emergency communication from a subscriber device;
a Public-Switched Telephone Network ("PSTN") switch; and
a remote access device connected to said remote device and said PSTN switch;
said remote device being configured to forward the emergency communication to said remote access device when said remote device is in Emergency Standalone ("ESA") mode;
said remote access device being configured to form a connection between said remote device and said PSTN switch such that the emergency communication is sent to said PSTN switch; and
an emergency router, said PSTN switch being configured to route, to said emergency router, the emergency communication and an identifier associated with a line connecting said remote access device to said PSTN switch, wherein said emergency router is configured to use said identifier to determine that the emergency communication came from said remote device in ESA mode.

2. The system of claim 1, wherein said remote device, said remote access device, and said PSTN switch comprise separate physical entities.

3. The system of claim 2, wherein said remote device, said remote access device, and said PSTN switch are co-located at a common wire center.

4. The system of claim 1, wherein said remote device is configured to process both Voice over Internet Protocol ("VoIP") signals and Time Division Multiplexing ("TDM") signals, including converting between the VoIP signals and the TDM signals.

5. The system of claim 1, wherein the emergency communication is received at said remote access device as a Voice over Internet Protocol ("VoIP") communication and forwarded to said remote access device as a Time Division Multiplexing ("TDM") communication.

6. The system of claim 1, wherein said remote device is connected to said remote access device by a first line, said remote access device terminating said first line, and wherein said PSTN switch is connected to said remote access device by a second line, said remote access device terminating said second line, said remote access device being configured to connect said first line and said second line to form said connection between said remote device and said PSTN switch.

7. The system of claim 6, wherein said remote access device includes a receiver off-hook filter configured to
recognize a receiver off-hook event on at least one of said first line and said second line, and
cause said remote access device to release the emergency communication upon recognition of the receiver off-hook event.

8. The system of claim 1, wherein said emergency router is configured to route the emergency communication to a Public Safety Answering Point ("PSAP") based on said identifier.

9. The system of claim 1, wherein said emergency router is configured to identify a geographic area served by said remote device.

10. The system of claim 1, further comprising an Integrated Service Control Point ("ISCP"), said PSTN switch being configured to send a request to said ISCP, said ISCP being configured to
determine information associated with an originator of the emergency communication,
use the information to identify routing instructions for the emergency communication, and
provide the routing instructions to said PSTN switch.

11. The system of claim 1, further comprising an Integrated Service Control Point ("ISCP"), said PSTN switch being configured to send a request to said ISCP, said ISCP being configured to
query at least one of said remote device and a host device associated with said remote device for information associated with an originator of the emergency communication,
use the information to identify routing instructions for the emergency communication when said at least one of said host device and said remote device respond to the query,
identify default routing instructions for the emergency communication when a response to the query is not received from said at least one of said host device and said remote device within a predetermined time interval, the default routing instructions being associated with a line connecting said remote access device to said PSTN switch, and
provide either the routing instructions or the default routing instructions to said PSTN switch.

12. A system comprising:
a remote device configured to receive an emergency communication from a subscriber device;
a Public-Switched Telephone Network ("PSTN") switch; and
a remote access device connected to said remote device by a first line and to said PSTN switch by a second line, said remote access device terminating said first line and said second line;
said remote device being configured to forward the emergency communication to said first line when said remote device is in Emergency Standalone ("ESA") mode;
said remote access device being configured to form a connection between said first line and said second line such that the emergency communication is sent to said PSTN switch;
said PSTN switch being configured to
recognize the emergency communication on said second line, and
route the emergency communication to an emergency service application; and
an emergency router, said PSTN switch being configured to route, to said emergency router, the emergency communication and an identifier associated with a line connecting said remote access device to said PSTN switch, wherein said emergency router is configured to use said identifier to determine that the emergency communication came from said remote device in ESA mode.

13. A method comprising:
receiving an emergency communication at a remote device in Emergency Standalone (ESA") mode;
forwarding the emergency communication from the remote device to a remote access device connected to the remote device; and
forming, at the remote access device, a connection between the remote device and a Public-Switch Telephone Network ("PSTN") switch such that the emergency communication is sent to the PSTN switch by establishing a connection between a first line connecting the remote device to the remote access device and a second line connecting the PSTN switch to the remote access device, routing the emergency communication and an identifier associated with the second line to an emergency router, and using the identifier to determine that the emergency communication came from the remote device in ESA mode.

14. The method of claim 13, wherein the emergency communication is received at the remote device as a Voice over Internet Protocol ("VoIP") communication and forwarded to the remote access device as a Time Division Multiplexing ("TDM") communication.

15. The method of claim 13, further comprising:
recognizing a receiver off-hook event on at least one of the first line and the second line, and
causing the remote access device to release the emergency communication upon said recognition of the receiver off-hook event.

16. The method of claim 13, further comprising the emergency router routing the emergency communication to a Public Safety Answering Point ("PSAP") based on the identifier.

17. The method of claim 16, further comprising providing, to the PSAP, data representative of a geographic area associated with remote device.

18. A system comprising:
a remote device configured to receive an emergency communication from a subscriber device;
a Public-Switched Telephone Network ("PSTN") switch; and
a remote access device connected to said remote device and said PSTN switch;
said remote device being configured to forward the emergency communication to said remote access device when said remote device is in Emergency Standalone ("ESA") mode;
said remote access device being configured to form a connection between said remote device and said PSTN switch such that the emergency communication is sent to said PSTN switch; and
wherein said remote device is configured to process both Voice over Internet Protocol ("VoIP") signals and Time Division Multiplexing ("TDM") signals, including converting between the VoIP signals and the TDM signals.

* * * * *